United States Patent Office 3,403,003
Patented Sept. 24, 1968

3,403,003
METHOD OF REMOVING BORON FROM SILICON TETRACHLORIDE
Lawrence Philip Morgenthaler, Washington, D.C., assignor to Western Electric Company, Incorporated, New York, N.Y., a corporation of New York
No Drawing. Filed Dec. 23, 1966, Ser. No. 604,121
10 Claims. (Cl. 23—205)

ABSTRACT OF THE DISCLOSURE

Boron is quantitatively removed from silicon tetrachloride by using phenol as an extraction agent.

---

This invention relates generally to the purification of silicon tetrachloride and, more particularly, the invention relates to a method for the quantitative removal of boron from liquid silicon tetrachloride which is to be used in the production of the hyperpure silicon necessary for semi-conductor applications.

Silicon tetrachloride ($SiCl_4$) is a basic raw material for the preparation of hyperpure silicon for semiconductor uses. Many of the impurities that are normally associated with this material are removed therefrom after the silicon metal is produced by the application of well-known zone refining techniques. This is not true of boron, however, as it has a distribution coefficient of 0.9 and does not move much during zone refining (Physics, vol. 20, p. 845, 1954). Thus, without an excessive number of passes of the molten zone, this technique is ineffective for boron removal. The importance of the quantitative removal of boron from silicon is illustrated by the fact that as little as 0.5 p.p.b. (parts per billion) of this element will influence the electrical properties of semiconductor-grade silicon.

Insofar as is known, present methods of removing boron from silicon intended for semiconductor uses start with the impure metal rather than the tetrachloride. One such method (U.S. Patent No. 3,148,131 assigned to Pechiney Compagnie de Produits Chemiques et Electrometallurgiques) requires that silicon powder be heated with a fluoride of a metal such as silver, copper or lead, followed by electrolytically recovering the purified silicon. The apparent limit of analysis in this work was 1 p.p.m., so it is not possible to tell the degree of boron trace removal. Needless to say, however, the difficulties in preventing recontamination during such a process would be substantial.

While no purification processes using the tetrachloride are known, three methods for analysis of trace quantities of boron in $SiCl_4$ have been developed, and two of these are of interest because of the preconcentration step that must be employed. The first method (Anal. Chem., vol. 33, pp. 767-70, 1961) is said to be effective in the range of 0.8 to 50 p.p.b. boron, and involves an emission spectrographic procedure wherein the sample is preconcentrated by partial hydrolysis with a dilute aqueous methyl cyanide solution. Hydrolysis produces silica and boric acid, both of which are insoluble in $SiCl_4$. The silica acts as a carrier to occlude the boric acid. There are several factors which preclude the use of hydrolysis as a production method of purifying silicon tetrachloride, chief amongst which is the fact that water reacts explosively with $SiCl_4$ at 25° C. but not at all at 5° C., for reasons which are unknown. Such a process would thus be extremely difficult to control and would be very hazardous. A second detrimental factor is a preferred reaction time of 16 hours.

The second method (Anal-Chem., vol. 36, pp. 245-6, 1964) is said to be effective in the range of 0 to 2000 p.p.b. This procedure involves the quantitative extraction of boron with an extraction agent comprising sulfuric acid and quinalizarin (1,2,5,8 - tetrahydroxyanthraquinone). A small amount of water is added to the extract to develop color and transmittance is measured on a spectrophotometer at a wavelength of 620 m$\mu$. The boron is then estimated from a standardization curve. The preconcentration by extraction comes about by the formation of a chelate ring, which involves the color change used in the analysis. The principal drawbacks to the use of such an extraction in a purification process are the elaborate precautions necessary to prohibit formation of silicic acid gels and the difficulties in handling the viscous extraction agent.

A third known preconcentration technique (Anal. Chem., vol. 29, p. 892, 1957) involves dialysis through a cation-permeable membrane, and is clearly of no significance for commercial purification purposes.

It is thus a general object of the present invention to provide a simple method for quantitative removal of boron from silicon tetrachloride.

Another object of the invention is to provide a method for removal of boron from silicon tetrachloride which is safe, rapid and economical.

Yet another object of the invention is to provide a method for removal of boron from silicon tetrachloride which does not involve any significant losses of $SiCl_4$.

Still another object of the invention is to provide an improved analytic technique for boron in silicon tetrachloride.

Various other objects and advantages of the invention will become clear from the following discussion of an embodiment thereof, and the novel features will be particularly pointed out in connection with the appended claims.

It has been discovered that phenol (carbolic acid) is an effective extraction agent which removes boron from silicon tetrachloride in a manner which meets all of the foregoing objects. While not wishing to be bound by a particular theory or reaction mechanism, it is believed that phenol reacts quickly with boron trichloride to form a compound of tri-phenyl borate and HCl, and that the phenol reacts slowly with $SiCl_4$ to form tri-chloro phenoxy silane, which acts as a carrier. Extraction is effective at essentially any level of phenol addition, reaction time is short, reaction temperature is not critical, and separation is readily accomplished by merely boiling off the $SiCl_4$ (boiling point 57.5° C.).

The selection of an extraction agent for this service is complicated by a peculiar set of requirements. In addition to the obvious requirements that there be no explosion hazard, that the reaction proceed well below the $SiCl_4$ boiling point and so forth, it is preferred that the reagent react quickly with the boron and slowly with the $SiCl_4$. For analytic purposes, it must react with the $SiCl_4$ to form a suitable carrier for the boron compound, which may amount to only a few p.p.m. to start with. Too fast a reaction with the $SiCl_4$, on the other hand, would involve large losses of the purified product. While many polyhydroxy aromatic compounds will react with boron or boron compounds, finding one that will react at all with $SiCl_4$ is perhaps the most difficult problem. Boron trichloride is a much stronger Lewis acid than silicon tetrachloride because of the presence of an unfilled p-orbital on the boron atom. In the case of silicon tetrachloride, there are no available low-energy orbitals, and unfilled $3d$ orbitals must be used for acid-base interaction. Reaction of $SiCl_4$ is further hampered by the tetarhedral structure of the molecule which may be represented steroptically as follows:

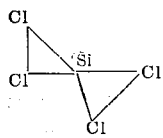

For reaction with $SiCl_4$, it is necessary for the reactant to penetrate through the electron clouds of the four chlorine atoms, which are very large, and also to penetrate to the $3d$ orbital of the silicon atom, as noted above. An additional requirement of a suitable reagent is that a hydrogen atom must be present on the basic molecule to react with the displaced chlorine atom to form hydrogen chloride.

It has been found that phenol does in fact react with $SiCl_4$, and while not known with surety the reaction is believed to be represented as follows:

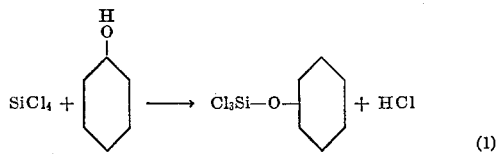

The reaction product, trichloro phenoxy silane, is soluble in $SiCl_4$, but is not volatile, so that it stays behind when the $SiCl_4$ is distilled off. While the reaction will proceed at a reasonable rate at room temperature, mild heating with agitation to about 34–40° C. is preferred.

The reaction of phenol with the boron is very rapid and quantitative under the same conditions. The boron is present in the $SiCl_4$ as the trichloride, and the initial reaction is believed to be as follows:

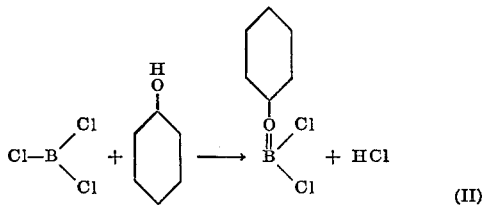

The reaction product here, dichloro phenoxy borate, is believed to continue to react with additional phenol until the triphenyl borate

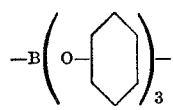

is formed, but this is apparently not the final reaction product. This conclusion is reached because when treating $SiCl_4$ heavily doped with boron in accordance with the invention, the residue after evaporation of the $SiCl_4$ was a liquid, rather than a solid as would be expected (triphenyl borate is solid at the evaporation temperature). It is thought that the borate may complex with the HCl in some unknown way, since the liquid decomposes with the evolution of HCl vapor.

As noted above, the proportions of phenol to $SiCl_4$ are not critical, particularly since boron is generally present only in trace quantities or a few p.p.m. to start with. In a number of tests, the phenol addition was reduced from 1.0 gm. to 0.1 gm. per 100 ml. of $SiCl_4$ without effecting the quantitative removal of boron. To insure complete reaction, the reactants should be mildy agitated. Heating to 34°–40° C. is desirable to have a sufficient quantity of the $SiCl_4$ react (Eq. I) to form a carrier within about 20–30 minutes. The separation is extremely simple, involving only boiling off the $SiCl_4$ and recovering the purified material as a condensate.

It will be understood by those skilled in the art of handling hyperpure materials that all necessary precautions must be observed to prevent recontamination. Specially deionized water must be employed in washing apparatus, and the phenol itself must be free of impurities. Phenol is readily purified by well-known sublimation techniques.

It is to be emphasized that the removal of boron by the method of the invention is quantitative, and was checked by sulfuric acid-quinalizarin extraction, sensitive to 0.2 p.p.b., which is well within acceptable limits for semiconductor use. The extracted samples were compared with doped samples in the 10–20 p.p.b. range.

While the method of the invention is primarily applicable to the purification of silicon tetrachloride on a production basis, it will be obvious that it also may be used as an analytical technique, since the method effectively concentrates the boron. In this instance the residue, after $SiCl_4$ evaporation, is recovered and analyzed by comparison with a suitable standard. Recovery is effected by adding water to completely hydrolyze the species, after which the water is evaporated, leaving silica contaminated with boron. The last traces of phenol are driven off by heating in an oven at 500° C., and the sample is then analyzed for boron spectrographically.

Various changes in the details, steps and materials, which have been herein described and illustrated in order to explain the nature of the invention, may be made by those skilled in the art within the principle and scope of the invention as expressed in the appended claims.

What is claimed is:

1. A method for removing boron from silicon tetrachloride containing same comprising:
   mixing said silicon tetrachloride with a small quantity of phenol for a period of time sufficient for a small quantity of said silicon tetrachloride to react with said phenol, at which time essentially all of said boron will have reacted with said phenol; and
   evaporating and recovering essentially boron-free silicon tetrachloride from the reaction mixture.

2. The method as claimed in claim 1, wherein said mixing is carried out at about 34°–40° C. for a period of about 20–30 minutes.

3. The method as claimed in claim 1, wherein about 0.1 to 1 gram of phenol is added per 100 milliliters of silicon tetrachloride.

4. A method for essentially quantitative removal of boron from silicon tetrachloride containing same comprising:
   reacting said silicon tetrachloride with a small quantity of phenol, said reaction being carried out under conditions controlled to produce a boron compound containing essentially all of the boron in said silicon tetrachloride, a small quantity of a silicon compound and HCl, said silicon compound acting as a carrier for said boron compound; and
   evaporating and recovering essentially boron-free silicon tetrachloride from the reaction mixture.

5. The method as claimed in claim 4, wherein said reaction is carried out at about 34–40° C. for a period of about 20–30 minutes, with agitation.

6. The method as claimed in claim 4, wherein about 0.1 to 1 gram of phenol is added per 100 milliliters of silicon tetrachloride.

7. The method as claimed in claim 4, wherein said boron compound contains triphenyl borate.

8. The method as claimed in claim 4, wherein said silicon compound is trichloro-phenoxy silane.

9. In a process for the purification of silicon tetrachloride, the improvement comprising using phenol as an extraction agent for quantitative removal of boron.

10. The method for analyzing trace quantities of boron in a silicon tetrachloride solution comprising:
  extracting said boron by mixing said solution with a small quantity of phenol, whereby both boron and silicon compounds are produced;
  evaporating said silicon tetrachloride;
  hydrolyzing the residue by adding water thereto;
  evaporating said water;
  driving off any remaining phenol by heating at about 500° C.; and
  analyzing said residue for boron spectrographically.

References Cited

UNITED STATES PATENTS

| 3,126,248 | 3/1964 | Pohl et al. | 23—205 |
| 3,216,784 | 11/1965 | Gauguin et al. | 23—87 |
| 3,252,752 | 5/1966 | Pohl et al. | 23—205 |

OTHER REFERENCES

Mellon, M. G.: Analytical Absorption Spectroscopy, John Wiley & Sons, N.Y., 1950.

OSCAR R. VERTIZ, *Primary Examiner.*

G. PETERS, *Assistant Examiner.*